US011734159B2

(12) United States Patent
Dutta et al.

(10) Patent No.: US 11,734,159 B2
(45) Date of Patent: Aug. 22, 2023

(54) RANKING TEST CASES SPECIFIC TO CHANGES IN SOFTWARE CODE

(71) Applicant: SAP SE, Walldorf (DE)

(72) Inventors: Amrit Shankar Dutta, Purulia (IN); Amitabh Goswami, Bangalore (IN)

(73) Assignee: SAP SE, Walldorf (DE)

( * ) Notice: Subject to any disclaimer, the term of this patent is extended or adjusted under 35 U.S.C. 154(b) by 168 days.

(21) Appl. No.: 17/407,018

(22) Filed: Aug. 19, 2021

(65) Prior Publication Data

US 2023/0068689 A1   Mar. 2, 2023

(51) Int. Cl.
*G06F 11/36* (2006.01)

(52) U.S. Cl.
CPC .................. *G06F 11/3676* (2013.01)

(58) Field of Classification Search
CPC ................................... G06F 11/3676
See application file for complete search history.

(56) References Cited

U.S. PATENT DOCUMENTS

| 2006/0070048 A1* | 3/2006 | Li ............... | G06F 11/3676 714/E11.207 |
| 2016/0154727 A1* | 6/2016 | Broomhall ......... | G06F 11/3672 717/124 |
| 2018/0260314 A1* | 9/2018 | Singi .................. | G06F 16/9024 |
| 2022/0156168 A1* | 5/2022 | Panikkar ............ | G06F 11/277 |

OTHER PUBLICATIONS

Zengkai Ma et al., "Test Case Prioritization Based on Analysis of Program Structure," 2008 [retrieved Mar. 23, 2023], 15th Asia-Pacific Software Engineering Conference, pp. 471-478, downloaded from <url>:https://ieeexplore.ieee.org. (Year: 2008).*

* cited by examiner

*Primary Examiner* — S. Sough
*Assistant Examiner* — Stephen D Berman
(74) *Attorney, Agent, or Firm* — Klarquist Sparkman, LLP (57) ABSTRACT

Technologies are described for ranking test cases related to changes in a software code base using at least a portion of a call graph that is generated from the software code base. The at least a portion of the call graph comprises method nodes corresponding to methods in the software code base. The method nodes represent control flow relationships between the methods in the software code base. The at least a portion of the call graph also comprises test case nodes. Each test case node is connected to one or more method nodes corresponding to coverage of the one or more method nodes by the test case node. Using the at least a portion of the call graph, the test case nodes are automatically ranked. Ranking of the test case nodes is performed by evaluating various criteria associated with the at least a portion of the call graph.

19 Claims, 6 Drawing Sheets

RANKING TEST CASES SPECIFIC TO CHANGES IN SOFTWARE CODE

BACKGROUND

Software development is often an iterative process during which software code is generated on a local computing device or hosted software development environment. The generated software code is committed to a code repository. The software code (also referred to as a codebase) is then tested to identify errors. In some cases, the testing is performed using test cases which are applied to the codebase in the code repository. Running test cases against a codebase can take a significant amount of time and consume a significant amount of computing resources.

In some situations, running certain test cases may not produce helpful results. For example, certain test cases may be unnecessary and/or may be less likely to identify errors in the codebase than other test cases. Execution of such test cases can cause issues during the software development process. For example, some software errors may go undetected, software developer productivity may be reduced, and delays in software development, testing, and/or deployment can occur.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for ranking test cases related to changes in a software code base. Test cases are ranked using at least a portion of a call graph that is generated from the software code base. The at least a portion of the call graph comprises method nodes corresponding to methods in the software code base. The method nodes represent control flow relationships between the methods in the software code base. The at least a portion of the call graph also comprises test case nodes. Each test case node is connected to one or more method nodes corresponding to coverage of the one or more method nodes by the test case node. Using the at least a portion of the call graph, the test case nodes are automatically ranked. Ranking of the test case nodes is performed by evaluating various criteria associated with the at least a portion of the call graph. For example, one criteria considers how many outgoing edges each method has to other method nodes. Another example criteria considers how many incoming edges each method node has from other method nodes. An indication of the ranking of the test case nodes can be output.

DETAILED DESCRIPTION

Overview

The following description is directed to technologies for ranking test cases related to changes in a software code base. Test cases are ranked using a call graph that is generated from the software code base. The call graph comprises method nodes corresponding to methods in the software code base. The method nodes represent control flow relationships (as edges in the call graph) between the methods in the software code base. The call graph also comprises test case nodes. Each test case node is connected to one or more method nodes corresponding to coverage of the one or more method nodes by the test case node. Using the call graph, the test case nodes are automatically ranked (e.g., from highest score to lowest score, indicating relative importance among the test case nodes). Ranking of the test case nodes is performed by evaluating various criteria associated with the call graph. For example, one criteria considers how many outgoing edges each method has to other method nodes. Another example criteria considers how many incoming edges each method node has from other method nodes. After the test case nodes have been ranked, an indication of the ranking can be output.

In some implementations, test cases are ranked using a portion of a call graph that includes method nodes corresponding to methods that have code changes (e.g., code changes due to a current code commit) For example, the portion of the call graph can be a call graph chain consisting of a collection of interconnected methods. The call graph chain can be generated by analyzing the code base to determine which methods call which other methods. Based on the analysis, a complete call graph can be generated for the code base, where the complete call graph comprises a number of call graph chains. Each call graph chain contains all interconnected methods (e.g., connected by "called by" edges) in the call graph chain, and can be independent and disconnected from the other call graph chains of the complete call graph. Using a given call graph chain, the test case nodes that are connected to the method nodes of the call graph chain can be ranked. The test case nodes can be ranked based on various criteria, including counts of edges (including edges between method nodes and/or edges between method nodes and test case nodes), distances between method nodes connected to test case nodes and method nodes corresponding to methods with code changes, incoming edges to test case nodes, and/or other criteria related to the call graph chain.

Using the technologies described herein, test cases can be automatically ranked using a call graph (i.e., by ranking the test case nodes corresponding to the test cases). By automatically ranking test cases, software testing can be performed more efficiently. For example, a given software project can be associated with many test cases (e.g., thousands of test cases or more). It may not be practical to run every test case for every software code change (e.g., for every code commit) Instead of running every test case, the technologies described herein automatically provide a ranking of relevant test cases. For example, for a software application associated with 1,000 test cases, the most relevant test cases can be identified and ranked (e.g., the most relevant 20 test cases can be identified and returned in an order according to their scores). Software testing can then be performed more efficiently while still testing the most important aspects of the software application (e.g., testing the methods that are most closely related to the most recent code changes). This procedure can save time and computing resources (e.g., reduced processor, memory, storage, and/or bandwidth computing resources).

Figure 1:
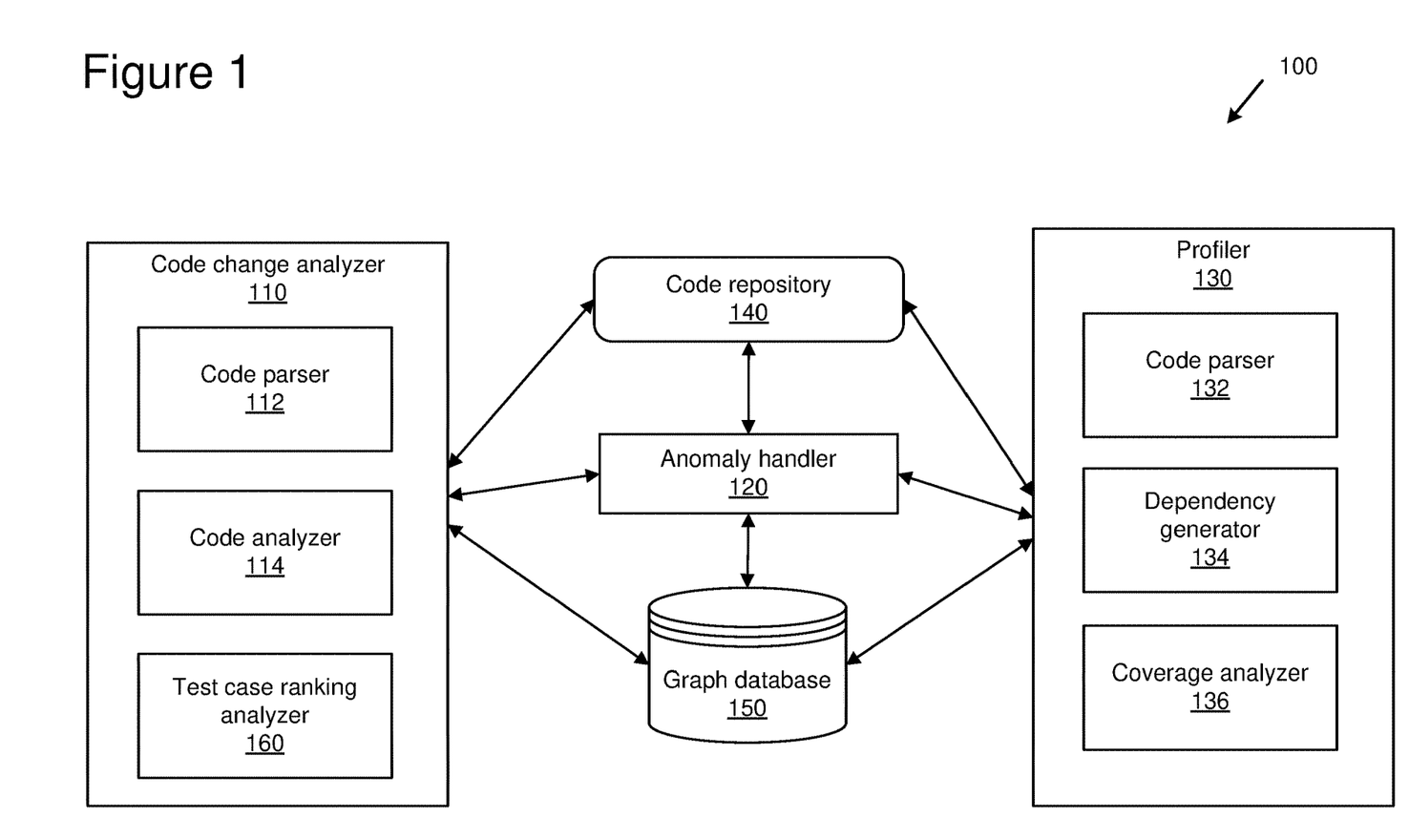
FIG. 1 is a diagram illustrating an architecture for ranking test cases related to changes in a software code base.

Example Environment for Ranking Test Cases Related to Changes in a Software Code Base In the technologies described herein, environments can be provided for ranking test cases related to changes in a software code base. FIG. 1 is an example environment 100, comprising various components for generating a call graph from a software code base and ranking test cases using the structure of the call graph. The various components of the example environment 100 can be implemented by software and/or hardware resources.

Specifically, the example environment 100 depicts components including a code change analyzer 110, an anomaly handler 120, and a profiler 130. These components 110, 120, 130 can be implemented using various types of software resources (e.g., web browser resources, application software, database software, etc.) and run on various types of hardware resources (e.g., computing devices such as desktops, servers, and laptops, virtual computing resources, cloud computing resources, etc.). For example, one or more of the components can be implemented as a web service or cloud service.

The components 110, 120, 130 can also be in communication with a code repository 140 which can take various forms including, a dedicated database or a software-as-a-service cloud-based code development management platform (e.g., GITHUB). The profiler 130 can generate and save relevant data from source code, byte code, and test coverage reports in the filesystem. The code change analyzer 110 provides the test case recommendations depending on the code base changes and data collected by the profiler 130. Further, the architecture can include a graph database 150 which can store the directed call graphs as provided herein.

The anomaly handler 120 can be used to handle less frequent situations such as a code change implicating more than 30% of the test cases or a code change having a number of files above a pre-defined threshold (e.g., five or more files). In such cases, a user can manually specify which test cases to execute or other exceptional handling can be performed with regard to the corresponding code changes. In other words, the anomaly handler 120 can handle deviations or take actions depending on a certain rule being triggered to fine tune the overall system. The anomaly handler 120 can execute a stitching algorithm as described below. The anomaly handler 120 can additionally run a complete test suite (i) in cases in which the number of implicated test cases is above a pre-defined threshold (e.g., 20%, etc.); (ii) against code changes of specific classes or call graphs; (iii) to a change-set crossing a predefined threshold in terms of number of methods or lines changed; or (iv) to non JAVA-based changes such as 'xml'/build files. The anomaly handler 120 can also log certain actions/results and generate alerts/messages indicating, for example, that no test cases were found in response to a particular change set (i.e., a change to the code base). The anomaly handler 120 can also identify impacted tests based on class rather than based on method when only the import statement is added/modified and/or when a class is moved. Further, the anomaly handler 120 can provide that a predefined set of critical tests are executed when there are white space changes and the like.

The profiler 130 can maintain or access information about the code base (also referred to as the software code base) in the code repository 140 including changes (sometimes referred to as deltas) which occur in between versions or other user-defined commits. The profiler 130 can also generate (e.g., by dependency generator 134) a call graph (as described in further detail below) which can be a bi-directional nth level call graph. Using the call graph, the profiler 130 can also generate the coverage per test case (e.g., by coverage analyzer 136). Coverage, in this regard, refers to which methods forming part of the code base are affected by (e.g., tested by) a particular test case.

The code change analyzer 110 can parse a commit provided by a revision control tool using a code parser 112 in connection with a code analyzer 114 to identify deltas of the code base in the code repository 140. The code change analyzer 110 provides the file(s) that are modified along with the method(s). This set of files and its method are passed to the code analyzer 114 module for further analysis. The code analyzer 114 can return the changes in terms of classes, methods or lines. In some variations, the delta changes can be characterized in terms of changes to methods. In other variations, different granularities of changes can be characterized such as on a line-by-line basis. In such cases, the nodes of a directed graph would represent lines of code.

The code forming the code base can take various forms and the code change analyzer 110 can use varying parsers as may be required by the particular code type. In some variations, an abstract syntax tree representation ("AST") of the code base at the time of the commit and an AST of the code base after the changes can be compared to identify changes to methods, lines, and the like. For example, when the code base in the code repository 140 comprises JAVA source code, a JAVA parser can be used to identify or otherwise characterize changes to the code base.

A source code parser 132 parses the source code to create some form of internal representation. The source code parser takes source code as input data and builds a data structure in the form of a parse tree, AST (Abstract Syntax Tree) or other hierarchical structure, giving a structural representation of the input source code. AST provides detailed information about all attributes/elements of JAVA source code. This representation can provide the package name of source code, import statements, type of source code (class/interface), internal attributes of class/interface (e.g., methods, constructors or field declaration), as well as start line and end line for each attribute. All of this information can be used to precisely identify source code modification for any change set. In some variations, JGIT library can alternatively or additionally be used to analyze source code as well as code repository commits (e.g., GIT Commits when the code repository 140 is GITHUB or a compatible repository) as opposed to the AST representation of the changes to the code.

The code change analyzer 110 can be used to provide byte code analysis metrics by analyzing compiled artifacts (e.g., JAR files, etc.) in order to generate a call graph so that, for given delta changes, the minimal number of required test cases can be determined (and then later executed). The code change analyzer 110 which can be a static code analyzer, can identify changed methods in the code based which can be transformed as nodes in a disconnected graph. After the code analyzer 110 establishes relations between methods in the code base, the whole codebase can be represented as a graph with many disconnected components. The nodes in the graph can each represent a method in the target codebase whereas each method is defined through node properties. Fully qualified class name, method name, and a parameters list are properties which can uniquely identify each method. Before the code analyzer 110 runs, the whole codebase is merely a disconnected graph of unique methods. The code analyzer 110 can also output caller and callee relationships among the methods. These relations among the methods can be represented as directed edges between the method nodes. The relations which are not explicitly discovered by the code analyzer 110 can then be transformed into edges by providing specific algorithms depending on the yet to be discovered design patterns. Such specific algorithms are referred to herein as stitching algorithms and are described in further detail below.

Call graphs, in this context, are directed graphs representing control flow relationships amongst the methods of a software code base (e.g., representing a software application or program). The nodes of the graph are the methods, while an edge from node 'node1' to node 'node2' indicates that method 'node1' invokes method 'node2'. The call graph can be generated by converting the source code forming part of the code base into an AST representation.

In a call graph, each method node corresponds to a different method of the code base (e.g., a first method node corresponds to a first method of the code base, a second method node corresponds to a second method of the code base, and so on). The edges connecting the method nodes are defined by the caller and callee relationship (e.g., as specified in the byte code). By tracing the complete call sequence of the methods in the code base, these methods exhibit the structure of a graph. In some implementations, a self-loop is legal in the call graph (e.g., a method calling itself).

As mentioned above, one variation is to analyze the code changes since a last commit (e.g., a last git commit) to identify a set of methods that have code changes. A call graph can then be reviewed to determine all related methods that should be probed as potentially being covered by a test case. The full result set of recommended test cases can be provided in various manners including loading into memory, storing in physical persistence, displaying a graphical user interface, transmitted to a remote computing system, and the like.

In some cases, the call graph can be stored in the graph database 150. A graph database 150, in this regard, refers to a database that uses graph structures for semantic queries for nodes, edges, and properties to represent and store data. The graph database 150 can provide a more rapid response time and can take various forms.

In some cases, the call graph may initially have disconnected nodes. Such idiosyncrasies can appear in the code base due to implementation of non-standard design patterns, JAVA reflections, runtime weaving, etc. These disconnects can be problematic in that interrelations amongst the method nodes may not be adequately captured (and thus not all implicated test cases may be identified). A stitching algorithm can be utilized to add edges to disconnected method nodes in the call graph.

The stitching algorithm can be used to connect disconnected method nodes. Pseudocode for the stitching algorithm can be as follows.

Algorithm
  Initialize
    Set D:={All standard and non-standard design patterns which are not discoverable by static code analyzer}
  Repeat for each Design Pattern D1 belonging to Set D
    1) Set CALLED:=Find out the set of methods nodes which should be called in runtime depending on D1.
    2) Set CALLEE:=Find out the set of methods nodes which should be calling above methods in runtime depending on D1.
    3) IF both the set CALLED and CALLEE is non-empty go to step 4, otherwise CONTINUE.
    4) Add directed edges to the set of nodes identified by CALLEE from the set of nodes identified by CALLED.

For example, with a particular exemplary application XYZ, ABC is a popular design pattern. ABC is invoked by instantiating an ABC object and passing it to an ABC handler. ABC handler can try to find the implementation by appending 'Impl' at the end of the ABC object name and discover it in specific packages. The code analyzer 110, in this situation, cannot create a complete call graph out of it. Thus, the stitching algorithm can find an immediate caller of ABC constructor and can stitch it to the method node corresponding to the ABC implementer in the call graph. Now, the ABC implementation becomes a participant at the end to end call graph.

The code change analyzer 110 also comprises a test case ranking analyzer 160. The test case ranking analyzer 160 performs operations for ranking test cases. For example, the test case ranking analyzer 160 can evaluate one or more of the criteria described herein in relation to at least a portion of a call graph (e.g., a call graph chain) to rank the test case nodes associated with the at least a portion of the call graph. The test case ranking analyzer 160 can perform the ranking by calculating a score for each of the test case nodes according to the equations described herein. The test case ranking analyzer 160 can output an indication of the ranked test case nodes (e.g., ranked in order of their scores).

Figure 2:
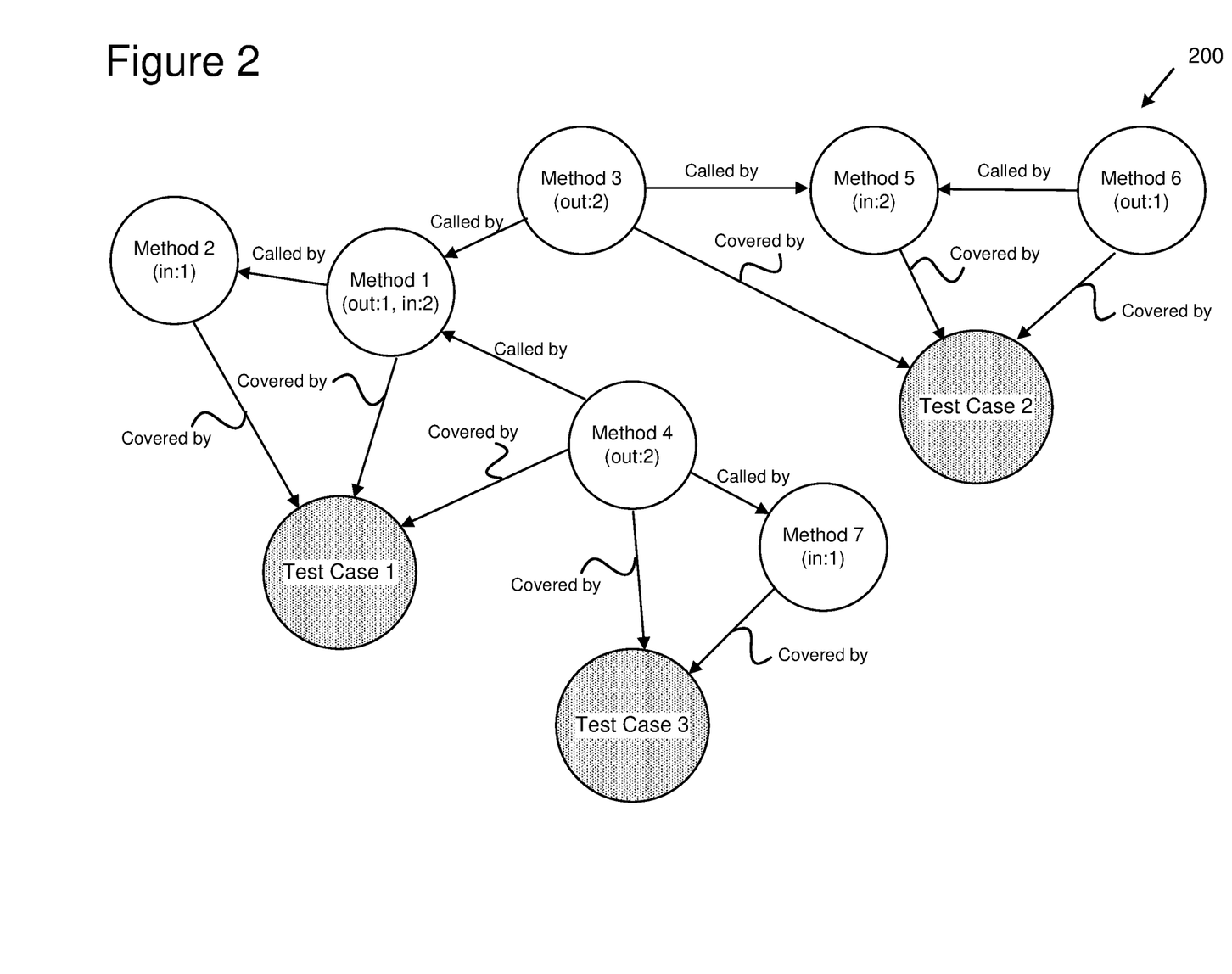
FIG. 2 is a diagram depicting an example call graph comprising method nodes and test case nodes, including out-degree and in-degree criteria.

FIG. 2 is a diagram depicting an example call graph 200 (e.g., a call graph chain) comprising method nodes and test case nodes, including out-degree and in-degree criteria. In the example call graph 200, each method (e.g., each method in a code base) is represented as a method node in the call graph, connected with other method nodes by edges named "called by". These edges are unidirectional as a call only occurs in a single direction. For example, in the example call graph 200, method 4 is called by method 1 and method 7. The initial call graph (containing only method nodes) is supplemented to represent test cases by way of different type of nodes, namely test case nodes. The test case nodes are related to the method nodes. Specifically, test case nodes are connected to the method nodes by edges named "covered by". When a given test case is associated with testing a given method, the corresponding method node is said to be "covered by" the corresponding test case node. For example, in the example call graph 200, method 4 and method 7 are covered by test case 3.

The example call graph 200 also depicts out-degree and in-degree criteria. Specifically, each of the method nodes is associated with an out-degree value and/or an in-degree value. The out-degree value indicates how many outgoing edges a given method node has to other method nodes. For example, the out-degree of method 3 is 2, the out-degree of method 1 is 1, the out-degree of method 2 is 0 (i.e., there are no outgoing edges from method 2), and so on. The in-degree value indicates how many incoming edges a given method node has from other method nodes. For example, the in-degree of method 3 is 0 (i.e., there are no incoming edges to method 3), the in-degree of method 1 is 2, the in-degree of method 2 is 1, and so on.

The example call graph 200 can represent a portion of a larger call graph for a software code base. For example, a call graph that is generated from a code base can have many separate call graph chains, with each call graph chain being disconnected from the other call graph chains. Each call graph chain contains a group of connected method nodes (i.e., the method nodes of a given call graph chain are connected via covered by edges). Having many call graph chains is common for a software application as there can be many independent control flows though the software application. Therefore, the example call graph 200 can be one of a number of call graph chains generated from the same code base. Furthermore, each of the call graph chains can be analyzed independently (e.g., by calculating criteria based on the nodes of the given call graph chain and ranking test cases associated with the given call graph chain).

Example Ranking Criteria

In the technologies described herein, various criteria can be used to rank test cases. Depending on the implementation, the criteria can be used individually (e.g., only one criteria) or in various combinations (e.g., a combination of two, three, four, or more criteria).

A first example criteria that can be considered when ranking test cases is a criteria that considers how many outgoing edges a given method node has to other method nodes (also called the "out-degree" of a given method node). In the call graph, method nodes are connected to other method nodes via "called by" edges and connected to test case nodes via "covered by" edges. If a given method node has more outgoing "called by" edges, it indicates that the given method node is called by many call sequences. On the contrary, if a given method node has fewer outgoing "called by" edges, it indicates that the given method node is less frequently used and attached to specific call sequences. With respect to test case ranking, in some implementations the number of outgoing "called by" edges present in the method nodes connected to a given test case node will inversely impact the ranking of the given test case node. In other words, a higher number of outgoing edges results in a proportionately lower ranking. For example, with reference to the example call graph 200, test case 1 is connected to method nodes that have a total of 3 outgoing "called by" edges, while test case 3 is connected to method nodes having a total of 2 outgoing "called by" edges. Therefore, with an inverse impact this criteria would indicate a higher ranking for test case 3 compared to test case 1 impact. However, in other implementations, a proportionately higher impact (instead of an inverse impact) can be applied resulting in a greater number of outgoing "called by" edges resulting in an increase to the ranking of connected test case nodes. The decision of whether to apply an inverse impact can depend on the type of software application being analyzed (e.g., the structure of the call graph can vary depending on the type of software application).

A second example criteria that can be considered when ranking test cases is a criteria that considers how many incoming edges a given method node has from other method nodes (also called the "in-degree" of a given method node). If a given method node has more incoming "called by" edges, it indicates that the given method node is pivotal for a set of call sequences. If a fault is introduced in such a pivotal method through a code change, then the fault has the potential to break one or more of the call sequences (e.g., resulting in an application error or crash). On the contrary, if a given method node has fewer incoming "called by" edges, it indicates that the given method node is just an ordinary method node attached to specific call sequences. With respect to test case ranking, the number of incoming "called by" edges present in the method nodes connected to a given test case node will proportionately increase the ranking of the given test case node.

A third example criteria that can be considered when ranking test cases is a criteria that considers the relative distance of method nodes present in the call graph from method nodes whose corresponding methods have code changes. For this criteria, test case nodes that are directly connected to method nodes with code changes are more important than test case nodes directly connected to other method nodes (whose corresponding methods do not have code changes) that are present in the call graph. Similarly, a test case node directly connected to the immediate caller or callee of a method node with a code change is more important than a test case node directly connected to a more distant caller or callee of the method node with the code change. With respect to test case ordering, the distance of a given test case node's directly connected method nodes from method nodes with code changes inversely impacts (proportionately decreases) ranking of the given test case node. In some implementations, if there are multiple method nodes corresponding to methods having code changes, the distance can be calculated by selecting an arbitrary one of the multiple method nodes. In addition, in some implementations, the distance is calculated as a positive value regardless of whether a given method node is a caller or callee. However, in other implementations, the caller portion of the call graph is represented with positive distances while the callee portion of the call graph is represented with negative distances (i.e., callers are prioritized over callees).

A fourth example criteria that can be considered when ranking test cases is a criteria that considers the number of incoming "covered by" edges for test case nodes. If a given test case node has a greater number of incoming "covered by" edges, which indicates that the given test case node covers many method nodes or many call graphs, then the given test case node is less unique in that it may perform more generic functions in the overall application (e.g., checking user authenticity is a function that can be shared across multiple other methods before granting access to data). However, if a given test case node has fewer incoming "covered by" edges, and is directly connected to method nodes with code changes, then the given test case node is likely more important (e.g., more unique) to testing the specific code changes (e.g., to the specific code changes implemented in the most recent code commit) With respect to test case ordering, the number of incoming "covered by" edges inversely impact (proportionately decreases) ranking of test cases. The term "connected" when used herein refers to nodes that are directly connected (e.g., a test case node that is connected to a method node with a "covered by" edge is said to be directly connected).

Example Ranking Calculations

In the technologies described herein, various criteria can be used to rank test cases. In some implementations, scores are calculated for test cases based on the various criteria (e.g., based on a combination of four criteria). In some implementations, the criteria are weighted (e.g., a different weight applied to each criteria).

Figure 3:
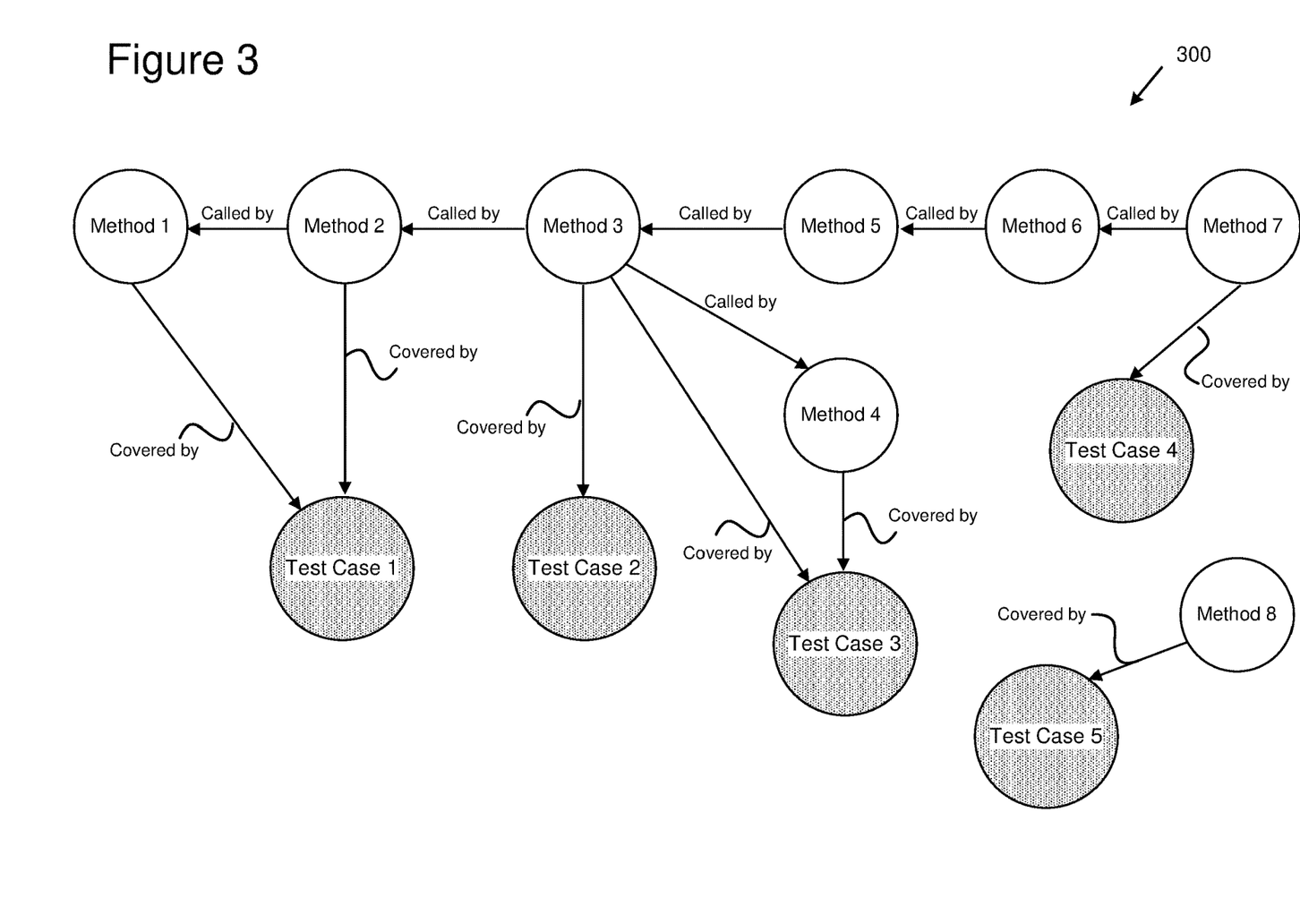
FIG. 3 is a diagram depicting an example call graph comprising method nodes and test case nodes, illustrating how scores can be calculated for test case nodes.

FIG. 3 is a diagram depicting an example call graph 300 comprising method nodes and test case nodes. The example call graph 300 depicts two call graph chains, a first call graph chain containing method nodes 1, 2, 3, 4, 5, 6, and 7 and associated test case nodes 1, 2, 3, and 4, and a second call graph chain containing method node 8 and associated test case 5. To illustrate how test scores can be calculated, suppose that the method associated with method node 3 has changed (e.g., because of a code commit) The other method nodes (method nodes 1, 2, 4, 5, 6, 7, and 8) in the example call graph 300 have not changed.

For this example calculation, the four criteria discussed above will be considered, which are:

$C_1$=total number of outgoing "called by" edges of all method nodes covered by a given test case node $C_2$=total number of incoming "called by" edges of all method nodes covered by a given test case node $C_3$=summation of all distances of methods from changed methods covered by a given test case node $C_4$=total number of incoming "covered by" edges for a given test case node The following equation is used to calculate the score for each test case.

$$Score = W_1 * \frac{1}{C_1} + W_2 * C_2 + W_3 * \frac{1}{C_3} + W_4 * \frac{1}{C_4}$$

The above equation calculates the score for a given test case using four score components corresponding to the four criteria. However, in other implementations, a different number of score components can be used (e.g., fewer score components and/or different score components), each of which may or may not be weighted. Furthermore, in the above equation $C_1$, $C_3$, and $C_4$ have an inverse impact on the raking. However, in other implementations, one or more of these criteria could have a proportionately higher impact (instead of an inverse impact).

The following table, Table 1, lists the values for $C_1$, $C_2$, and $C_3$ for each of the method nodes in the example call graph 300.

TABLE 1

Criteria values for method nodes

| Method node | $C_1$ (out-degree) | $C_2$ (in-degree) | $C_3$ (distance) |
|---|---|---|---|
| Method node 1 | 0 | 1 | 3 |
| Method node 2 | 1 | 1 | 2 |
| Method node 3 | 2 | 1 | 1 |
| Method node 4 | 0 | 1 | 2 |
| Method node 5 | 1 | 1 | 2 |
| Method node 6 | 1 | 1 | 3 |
| Method node 7 | 1 | 0 | 4 |
| Method node 8 | 0 | 0 | NA |

The following table, Table 2, lists the values for $C_4$, for each test case node in the example call graph 300.

TABLE 2

Criteria values for test case nodes

| Test case | $C_4$ (test case node in-degree) |
|---|---|
| Test case 1 | 2 |
| Test case 2 | 1 |
| Test case 3 | 2 |
| Test case 4 | 1 |
| Test case 5 | 1 |

Using the values from Table 1 and Table 2 above, the following scores would be calculated for each test case:

Test case 1 score =
$$W_1 * [1/(1+0)] + W_2 * (1+1) + W_3 * [1/(2+3)] + W_4 * [1/(2)] =$$
$$W_1 + 2*W_2 + 0.2*W_3 + 0.5*W_4$$

Test case 2 score = $W_1 * [1/(2)] + W_2 * (1) + W_3 * [1/(1)] + W_4 * [1/(1)] =$
$$0.5*W_1 + W_2 + W_3 + W_4$$

Test case 3 score = $W_1 * [1/(2+0)] + W_2 * (1+1) + W_3 * [1/(1+2)] +$
$$W_4 * [1/(2)] = 0.5*W_1 + 2*W_2 + 0.333*W_3 + 0.5*W_4$$

Test case 4 = $W_1 * [1/1] + W_2 * (0) + W_3 * [1/(4)] + W_4 * [1/(1)] =$
$$2*W_1 + 0.25*W_3 + W_4$$

Test case 5 score=NA (test case 5 is in a different call graph chain and is therefore not impacted to the code change to method node 3)

The final test case scores depend on the weights that are used for the given implementation. As a simplified example, if all of the weights have a value of 1.0, then the following test case scores would be calculated:

Test case 1 score=3.7
Test case 2 score=3.5
Test case 3 score=3.333
Test case 4 score=3.25

The test cases can then be ranked from highest score to lowest score as follows: test case 1, test case 2, test case 3, and test case 4.

In this example calculation, the following rules are followed.

a) If the number of total outgoing edges is zero, the inverse function should produce zero.

b) The distance values start at one, rather than zero. Using this starting value does not alter the relative score calculation. Also, the distances are positive values regardless of whether the relationship is caller or callee.

c) The calculations shown are limited to three decimal places for ease of illustration. The precision can be increased or decreased as needed.

The weights can be automatically determined and/or user configurable values. In some implementations, the weights are automatically determined using a machine learning model (e.g., a machine learning model that has been trained with training data comprising scored test cases) or linear regression.

Depending on the implementation, calculation of the test case scores may or may not use weights. For example, weights may not be used for any of the score components, or weights may only be used for one or more (but not all) of the score components.

In some implementations, the scores of each test case are used to determine a partial ordering among the test cases. The ordering of test cases is returned as a partial ordering because some test cases could have the same score. The partial ordering of test cases is a greater than or equal to ordering in which the score of a given test case is greater than or equal to the score of a next test case in the ordering, which can be illustrated as follows for test cases A through N:

test case A>=test case B>=test case C>=>=test case N

In some implementations, the distance criteria (e.g., $C_3$) uses positive values for the caller portion of the call graph and uses negative values for the callee portion of the call graph. For example, in the example call graph 300, method node 1 would have a positive distance value (+3) because it is a caller of method node 2, which in turn is a caller of method node 3, while method node 7 would have a negative distance value (−4) because it is on the callee portion of the call graph.

Methods for Ranking Test Cases Related to Code Changes

In the technologies described herein, methods can be provided for ranking test cases related to changes in a software code base. For example, the ranking can be performed by a test case ranking analyzer, such as test case ranking analyzer 160. Test cases can be ranked by analyzing at least a portion of a call graph (e.g., a call graph chain). For example, a call graph chain that contains at least one method node associated with a method having a code change (e.g., a change to the software code base due to a current code commit).

Figure 4:
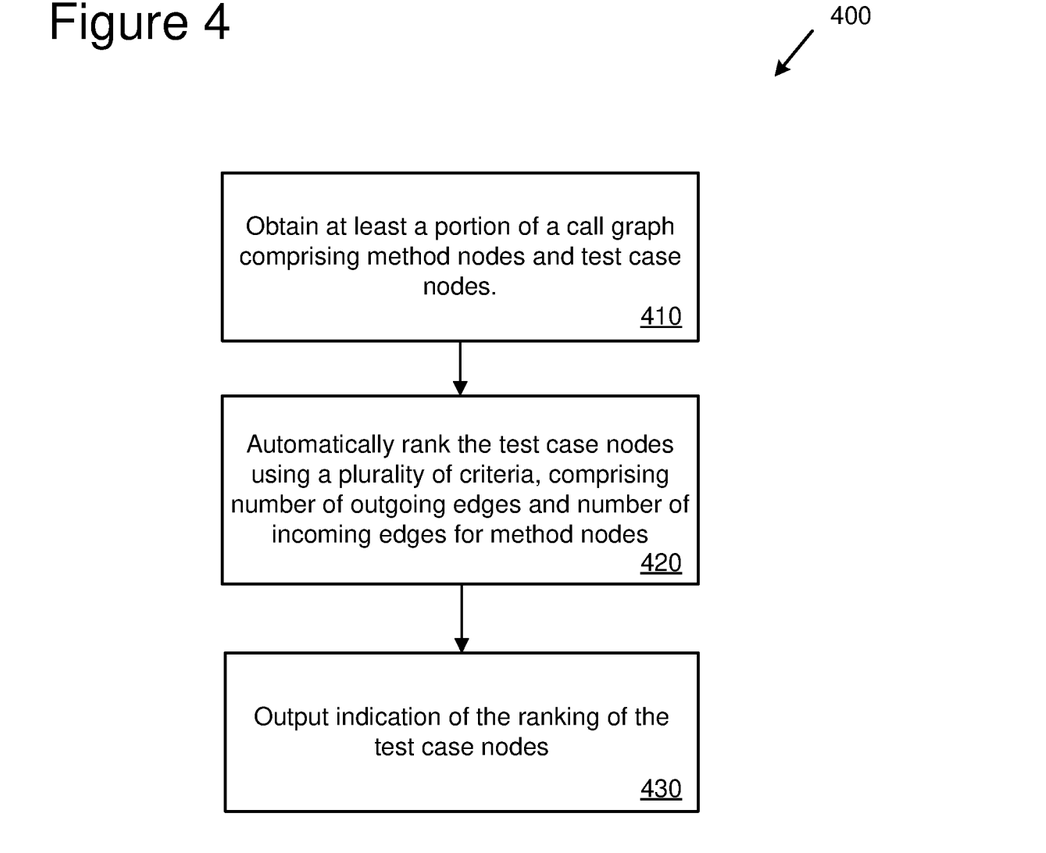
FIG. 4 is a flowchart of an example process for ranking test cases related to changes in a software code base.

FIG. 4 is a flowchart of an example process 400 for ranking test cases related to changes in a software code base. For example, the example process 400 can be performed by a test case ranking analyzer, such as test case ranking analyzer 160.

At 410, at least a portion of a call graph is obtained, which could be a call graph chain. The at least a portion of the call graph comprises method nodes and test case nodes. In some implementations, one or more of the method nodes are identified as associated with methods that have code changes since a last code commit (e.g., code changes between the last code commit and a current code commit) In some implementations, one or more of the test case nodes are associated with the identified method nodes associated with methods having code changes.

At 420, the test case nodes are automatically ranked using a plurality of criteria. The plurality of criteria can comprise the number of outgoing edges each method node has to other method nodes and/or the number of incoming edges each method node has from other method nodes. The plurality of criteria can also comprise the distance from a given test case node to one of the method nodes identified as associated with a code change (e.g., the closest method node identified as associated with a code change). The plurality of criteria can also comprise the number of incoming edges to a given test case node from connected method nodes. The ranking can be performed by calculating a score for each test case node based on one or more of the criteria. In some implementations, each criteria has an associated weight that us used when calculating the score.

At 430, an indication of the ranking of the test case nodes (as determined at 420) is output. In some implementations, the indication of the ranking comprises an ordered list of test case nodes, from highest ranked test case node (e.g., the test case node with the highest score) to lowest ranked test case node (e.g., the test case node with the lowest score). The indication of the ranking can be displayed (e.g., in a computer user interface), saved to a file, sent as an email or instant message, or output in another manner. The output ranking can be used when performing testing of the software. For example, automated or manual execution of the test cases can be performed in their ranked order. As another example, if limited time and/or computing resources are available for testing, just the highest ranked test cases can be executed in order.

In some implementations, the example process 400 is performed for a call graph chain that contains one or more method nodes whose corresponding methods have code changes. For example, a software code base can be analyzed, and an overall call graph can be generated. The call graph chains of the overall call graph can be analyzed to determine which of the call graph chains contain method nodes associated with code changes (i.e., having corresponding method nodes whose software code has changed). One or more of the identified call graph chains can then be processed using the example process 400 to rank the test case nodes for each of the one or more identified call graph chains.

Figure 5:
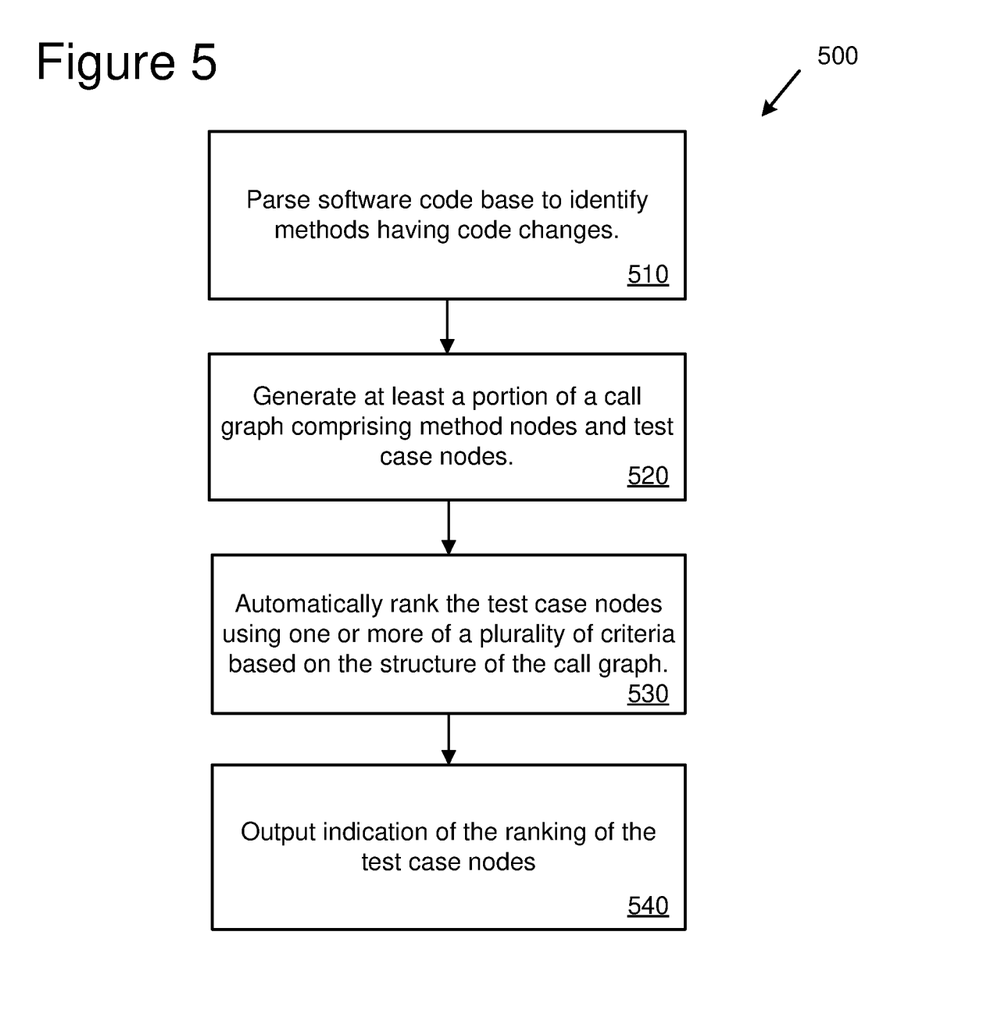
FIG. 5 is a flowchart of an example process for ranking test cases related to changes in a software code base, including parsing the software code base.

FIG. 5 is a flowchart of an example process 500 for ranking test cases related to changes in a software code base. For example, the example process 500 can be performed by a test case ranking analyzer, such as test case ranking analyzer 160.

At 510, a software code base (e.g., comprising software code for an application) is parsed to identify methods having code changes. For example, a code repository can be evaluated to determine the most recent change to the software code base (e.g., the last code commit) The methods that were affected by the most recent change to the software code base can then be identified.

At 520, at least a portion of a call graph is generated, which could be a call graph chain. The at least a portion of the call graph comprises method nodes and test case nodes. The call graph includes the methods nodes identified as having code changes (e.g., the identified method nodes can be labeled in the call graph or associated graph database). In some implementations, one or more of the test case nodes are associated with the identified method nodes associated with methods having code changes.

At 530, the test case nodes are automatically ranked using one or more criteria. The ranking is automatically performed based on the structure of the at least a portion of the call graph, including edges between method nodes (e.g., "called by" edges) and/or edges between test case nodes and methods nodes (e.g., "covered by" edges). The one or more criteria can include a criteria evaluating a number of outgoing edges each method node has to other of the method nodes in the at least a portion of the call graph. The one or more criteria can include a criteria evaluating a number of incoming edges each method node has from other of the method nodes. The one or more criteria can include a criteria evaluating, for each test case node, distance from one or more method nodes covered by the test case node to one or more of the method nodes identified as associated with methods having code changes. The one or more criteria can include criteria evaluating a number of incoming edges to each test case node. The one or more criteria can include additional and/or other criteria than those mentioned here.

At 540, an indication of the ranking of the test case nodes (as determined at 530) is output. In some implementations, the indication of the ranking comprises an ordered list of test case nodes, from highest ranked test case node (e.g., the test case node with the highest score) to lowest ranked test case node (e.g., the test case node with the lowest score). The indication of the ranking can be displayed (e.g., in a computer user interface), saved to a file, sent as an email or instant message, or output in another manner. The output ranking can be used when performing testing of the software. For example, automated or manual execution of the test cases can be performed in their ranked order. As another example, if limited time and/or computing resources are available for testing, just the highest ranked test cases can be executed in order.

In some implementations, the example process 500 is performed for a call graph chain that contains one or more of the method nodes identified as associated with code changes. For example, a software code base can be analyzed, and an overall call graph can be generated. The call graph chains of the overall call graph can be analyzed to determine which of the call graph chains contain method nodes associated with code changes (i.e., having corresponding method nodes whose software code has changed). One or more of the identified call graph chains can then be processed using the example process 500 to rank the test case nodes for each of the one or more identified call graph chains.

Computing Systems

Figure 6:
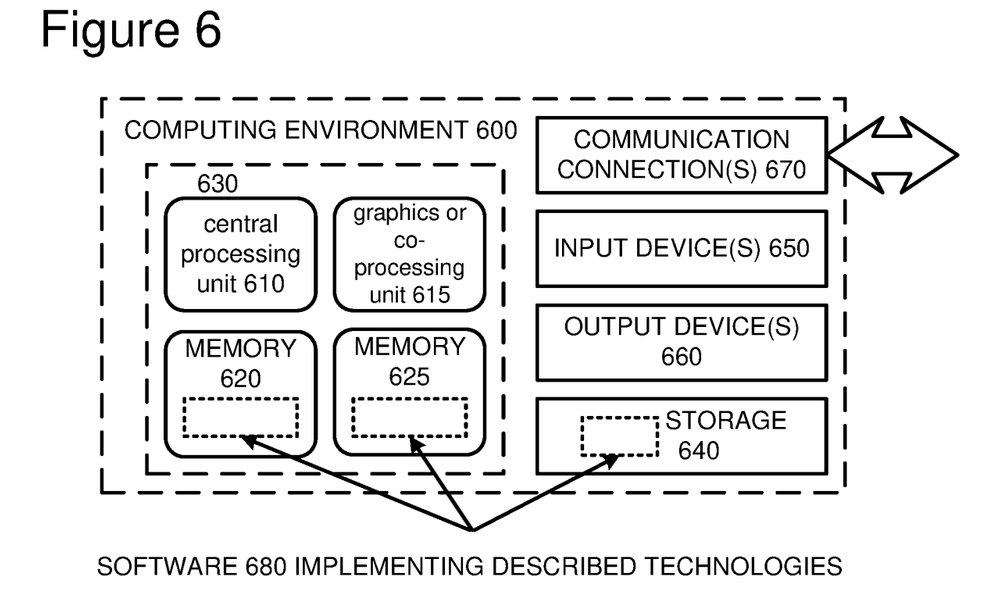
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
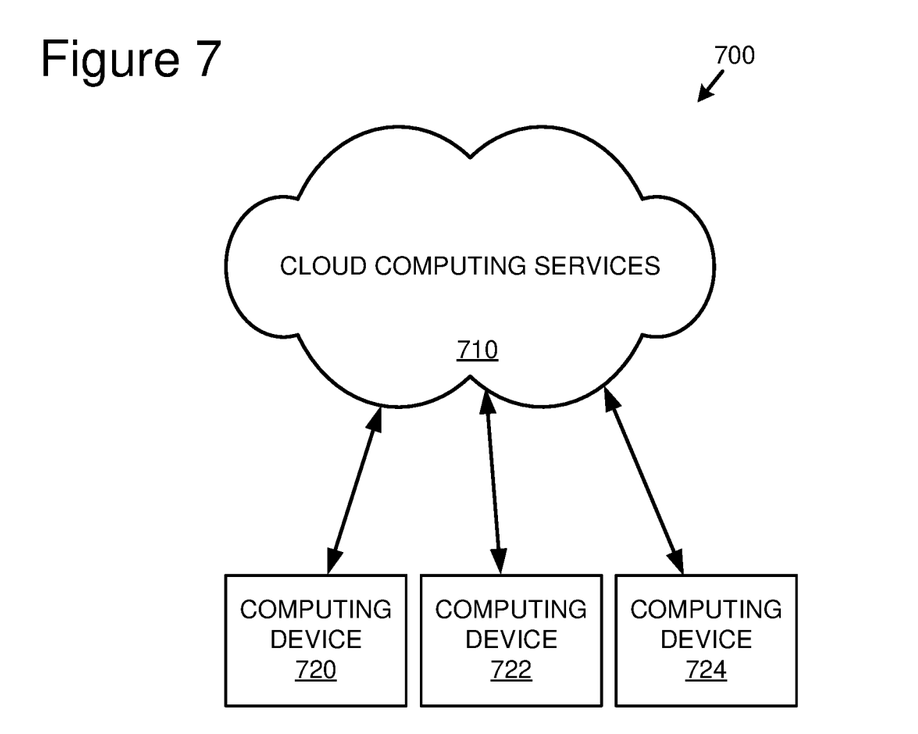
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for ranking test cases related to changes in a software code base, the method comprising:
    obtaining at least a portion of a call graph, wherein the at least a portion of the call graph comprises:
        method nodes corresponding to methods in the software code base, wherein the method nodes represent control flow relationships between the methods in the software code base, and wherein a subset of the method nodes are identified as associated with methods that have code changes; and
        test case nodes corresponding to test cases used to test the software code base, wherein each of the test case nodes is connected to one or more of the method nodes corresponding to coverage of the one or more of the method nodes by the test case node, and wherein a subset of the test case nodes are identified as connected to the method nodes identified as associated with the methods that have code changes;
    automatically ranking the test case nodes using a plurality of criteria based on structure of the at least a portion of the call graph, wherein the plurality of criteria consider at least:
        how many outgoing edges each of the method nodes has to other of the method nodes; and
        how many incoming edges each of the method nodes has from other of the method nodes; and
        wherein automatically ranking the test case nodes comprises:
            for each of the test case nodes, calculating a score for the test case node comprising:
                calculating a first score component for a first criteria based on a number of outgoing (called_by) edges for each of the method nodes that is directly connected to the test case node;
                calculating a second score component for a second criteria based on a number of incoming (called_by) edges for each of the method nodes that is directly connected to the test case node; and
                calculating the score for the test case node based at least in part on the first score component and the second score component; and
            ranking the test case nodes in an order based on their scores; and
    outputting an indication of the ranking of the test case nodes;
    wherein at least a plurality of the test cases that correspond to the test case nodes are executed in the order based on their scores.

2. The method of claim 1, wherein automatically ranking the test case nodes comprises:
for each of the method nodes, counting a number of outgoing (called by) edges to other of the method nodes, wherein a greater number of the outgoing edges for a given method node results a proportionately lower ranking of test case nodes directly connected to the given method node.

3. The method of claim 1, wherein automatically ranking the test case nodes comprises:
for each of the method nodes, counting a number of incoming (called by) edges from other of the method nodes, wherein a greater number of the incoming edges for a given method node results in a proportionately higher ranking of test case nodes directly connected to the given method node.

4. The method of claim 1, wherein automatically ranking the test case nodes comprises:
for each of the method nodes, counting a number of outgoing (called by) edges to other of the method nodes, wherein a greater number of the outgoing edges for a given method node results a proportionately lower ranking of test case nodes directly connected to the given method node; and
for each of the method nodes, counting a number of incoming (called by) edges from other of the method nodes, wherein a greater number of the incoming edges for a given method node results in a proportionately higher ranking of test case nodes directly connected to the given method node.

5. The method of claim 1, wherein calculating the score for each of the test case nodes further comprises:
weighting the first score component by a first weight value; and
weighting the second score component by a second weight value.

6. The method of claim 5, wherein the first weight value and the second weight value are determined using a machine learning model or linear regression.

7. The method of claim 1, wherein automatically ranking the test case nodes further comprises:
for each of the test case nodes, calculating the score for the test case node comprising:
calculating a third score component based on distance from the one or more method nodes covered by the test case node to one or more of the method nodes identified as associated with the methods having code changes;
calculating a fourth score component based on a number of incoming (covered by) edges to the test case node from the method nodes; and
calculating the score for the test case node based at least in part on the first score component, the second score component, the third score component, and the fourth score component.

8. The method of claim 7, wherein calculating the score for each of the test case nodes further comprises:
weighting the first score component by a first weight value;
weighting the second score component by a second weight value;
weighting the third score component by a third weight value; and
weighting the fourth score component by a fourth weight value.

9. The method of claim 1, wherein the at least a portion of the call graph is a call graph chain that is independent of, and disconnected from, other call graph chains for the software code base.

10. The method of claim 1, further comprising:
parsing the software code base to identify methods having code changes since the last code commit; and
generating the at least a portion of the call graph;
wherein the at least a portion of the call graph is a single call graph chain of connected method nodes and connected test case nodes, without any disconnected method nodes or disconnected test case nodes.

11. One or more computing devices comprising:
processors; and
memory;
the one or more computing devices configured, via computer-executable instructions, to perform operations for ranking test cases related to changes in a software code base, the operations comprising:
obtaining at least a portion of a call graph, wherein the at least a portion of the call graph comprises:
method nodes corresponding to methods in the software code base, wherein the method nodes represent control flow relationships between the methods in the software code base, and wherein a subset of the method nodes are identified as associated with methods that have code changes since a last code commit;
test case nodes corresponding to test cases used to test the software code base, wherein each of the test case nodes is connected to one or more of the method nodes corresponding to coverage of the one or more of the method nodes by the test case node, and wherein a subset of the test case nodes are identified as connected to the method nodes identified as associated with the methods that have code changes since the last code commit;
automatically ranking the test case nodes using a plurality of criteria based on structure of the at least a portion of the call graph, wherein the plurality of criteria consider at least:
how many outgoing edges each of the method nodes has to other of the method nodes; and
how many incoming edges each of the method nodes has from other of the method nodes; and
wherein automatically ranking the test case nodes comprises:
for each of the test case nodes, calculating a score for the test case node comprising:
calculating a first score component for a first criteria based on a number of outgoing (called_by) edges for each of the method nodes that is directly connected to the test case node;
calculating a second score component for a second criteria based on a number of incoming (called_by) edges for each of the method nodes that is directly connected to the test case node; and
calculating the score for the test case node based at least in part on the first score component and the second score component; and
ranking the test case nodes in an order based on their scores; and
outputting an indication of the ranking of the test case nodes;

wherein at least a plurality of the test cases that correspond to the test case nodes are executed in the order based on their scores.

12. The one or more computing devices of claim 11, wherein automatically ranking the test case nodes comprises:
for each of the method nodes, counting a number of outgoing (called_by) edges to other of the method nodes, wherein a greater number of the outgoing edges for a given method node results a proportionately lower ranking of test case nodes directly connected to the given method node.

13. The one or more computing devices of claim 11, wherein automatically ranking the test case nodes comprises:
for each of the method nodes, counting a number of incoming (called_by) edges from other of the method nodes, wherein a greater number of the incoming edges for a given method node results in a proportionately higher ranking of test case nodes directly connected to the given method node.

14. The one or more computing devices of claim 11, wherein automatically ranking the test case nodes further comprises:
for each of the test case nodes, calculating the score for the test case node comprising:
calculating a third score component based on distance from the one or more method nodes covered by the test case node to one or more of the method nodes identified as associated with methods having code changes;
calculating a fourth score component based on a number of incoming (covered by) edges to the test case node from the method nodes; and
calculating the score for the test case node based at least in part on the first score component, the second score component, the third score component, and the fourth score component.

15. The one or more computing devices of claim 11, wherein the at least a portion of the call graph is a call graph chain that is independent of, and disconnected from, other call graph chains for the software code base.

16. One or more computer-readable storage media storing computer-executable instructions for execution on one or more computing devices to perform operations for ranking test cases related to changes in a software code base, the operations comprising:
parsing the software code base to identify methods having code changes since a last code commit;
generating at least a portion of a call graph, wherein the at least a portion of the call graph comprises:
method nodes corresponding to methods in the software code base, wherein the method nodes represent control flow relationships between the methods in the software code base, and wherein a subset of the method nodes are identified as associated with the methods that have code changes since the last code commit;
test case nodes corresponding to test cases used to test the software code base, wherein each of the test case nodes is connected to one or more of the method nodes corresponding to coverage of the one or more of the method nodes by the test case node, and wherein a subset of the test case nodes are identified as connected to the method nodes identified as associated with the methods that have code changes since the last code commit;
automatically ranking the test case nodes using one or more of the following criteria:
a first criteria evaluating a number of outgoing edges each of the method nodes has to other of the method nodes;
a second criteria evaluating a number of incoming edges each of the method nodes has from other of the method nodes;
a third criteria evaluating distances from the one or more method nodes covered by each of the test case nodes to one or more of the method nodes identified as associated with methods having code changes; or
a fourth criteria evaluating a number of incoming edges to each of the test case nodes; and
wherein automatically ranking the test case nodes comprises:
for each of the test case nodes, calculating a score for the test case node comprising:
calculating a first score component for the first criteria based on a number of outgoing (called_by) edges for each of the method nodes that is directly connected to the test case node;
calculating a second score component for the second criteria based on a number of incoming (called_by) edges for each of the method nodes that is directly connected to the test case node; and
calculating the score for the test case node based at least in part on the first score component and the second score component; and
ranking the test case nodes in an order based on their scores; and
outputting an indication of the ranking of the test case nodes;
wherein at least a plurality of the test cases that correspond to the test case nodes are executed in the order based on their scores.

17. The one or more computer-readable storage media of claim 16, wherein automatically ranking the test case nodes is performed based at least in part on the first criteria and the second criteria, comprising:
for each of the method nodes, counting a number of outgoing (called by) edges to other of the method nodes, wherein a greater number of the outgoing edges for a given method node results in a proportionately lower ranking of test case nodes directly connected to the given method node; and
for each of the method nodes, counting a number of incoming (called by) edges from other of the method nodes, wherein a greater number of the incoming edges for a given method node results in a proportionately higher ranking of test case nodes directly connected to the given method node.

18. The one or more computer-readable storage media of claim 17, wherein automatically ranking the test case nodes is performed based at least in part on the third criteria and the fourth criteria, comprising:
for each of the test case nodes, determining a distance from the one or more method nodes covered by the test case node to a closest of the method nodes identified as associated with the methods having code changes, wherein a greater distance results a proportionately lower ranking of the test case node; and
for each of the test case nodes, counting a number of incoming (covered by) edges to the test case node from the method nodes, wherein a greater number of the incoming edges for a given test case node results in a proportionately lower ranking of the given test case node.

19. The one or more computer-readable storage media of claim 16, wherein automatically ranking the test case nodes further comprises:

for each of the test case nodes, calculating the score for the test case node comprising:

calculating a third score component for the third criteria based on distance from the one or more method nodes covered by the test case node to one or more of the method nodes identified as associated with the methods having code changes;

calculating a fourth score component for the fourth criteria based on a number of incoming (covered by) edges to the test case node from the method nodes; and calculating the score for the test case node based at least in part on the first score component, the second score component, the third score component, and the fourth score component.

\* \* \* \* \*